(12) United States Patent
Sumi et al.

(10) Patent No.: US 9,779,625 B2
(45) Date of Patent: Oct. 3, 2017

(54) PROXIMITY ALARM DEVICE, PROXIMITY ALARM SYSTEM, MOBILE DEVICE, AND METHOD FOR DIAGNOSING FAILURE OF PROXIMITY ALARM SYSTEM

(71) Applicant: Panasonic Intellectual Property Management Co., Ltd., Osaka (JP)

(72) Inventors: Shigeharu Sumi, Mie (JP); Ichiro Ohno, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 53 days.

(21) Appl. No.: 14/404,910

(22) PCT Filed: Jul. 3, 2013

(86) PCT No.: PCT/JP2013/004128
§ 371 (c)(1),
(2) Date: Dec. 1, 2014

(87) PCT Pub. No.: WO2014/006893
PCT Pub. Date: Jan. 9, 2014

(65) Prior Publication Data
US 2015/0145660 A1    May 28, 2015

(30) Foreign Application Priority Data
Jul. 4, 2012   (JP) ................................ 2012-150097

(51) Int. Cl.
*G08G 1/16*   (2006.01)
*B60Q 5/00*   (2006.01)
*G10K 9/18*   (2006.01)

(52) U.S. Cl.
CPC ............. *G08G 1/166* (2013.01); *B60Q 5/008* (2013.01); *G08G 1/165* (2013.01); *G10K 9/18* (2013.01)

(58) Field of Classification Search
CPC .. B60Q 1/525; G08B 3/10; H04R 3/12; B06B 1/0276
(Continued)

(56) References Cited

U.S. PATENT DOCUMENTS 4,881,058 A * 11/1989 Berry, III ............... G08B 27/00
340/326
5,345,510 A * 9/1994 Singhi ..................... H04M 3/10
381/55

(Continued)

FOREIGN PATENT DOCUMENTS

| CN | 101264755 | 9/2008 |
|----|-----------|--------|
| CN | 101380927 | 3/2009 |

(Continued)

OTHER PUBLICATIONS

English Translation of Chinese Search Report dated Feb. 29, 2016 for the related Chinese Patent Application No. 201380035371.7.
(Continued)

*Primary Examiner* — Joseph Feild
*Assistant Examiner* — Omar Casillashernandez
(74) *Attorney, Agent, or Firm* — McDermott Will & Emery LLP

(57) ABSTRACT

A proximity alarm device includes a control unit, an amplifying unit, an output terminal, a ground terminal, a detection unit, and a determining apparatus. The control unit receives an input of a referencing signal. An output of the control unit is electrically connected to the amplifying unit. An output of the amplifying unit is electrically connected to an output terminal. The ground terminal is electrically connected to a
(Continued)

ground. The output of the amplifying unit is electrically connected to the detection unit. An output of the detection unit is electrically connected to the determining apparatus. Then, the determining apparatus compares a detection signal detected by the detection unit and a determination reference signal with each other.

31 Claims, 9 Drawing Sheets

(58) Field of Classification Search
USPC .......... 340/435, 384.7, 384.1, 384.5; 381/77, 381/58, 59
See application file for complete search history.

(56) References Cited

U.S. PATENT DOCUMENTS

| | | | | |
|---|---|---|---|---|
| 6,137,044 | A | * | 10/2000 | Guilmette ................ G10H 7/12 84/603 |
| 6,603,392 | B1 | * | 8/2003 | Ramm .................... G08B 3/10 340/384.1 |
| 7,764,800 | B2 | | 7/2010 | Maeda |
| 8,204,243 | B2 | | 6/2012 | Smith |
| 2002/0024396 | A1 | | 2/2002 | Yamashita et al. |
| 2004/0170288 | A1 | | 9/2004 | Maeda |
| 2005/0283839 | A1 | * | 12/2005 | Cowburn ............... G06K 19/12 726/26 |
| 2006/0052957 | A1 | | 3/2006 | Hidehira |
| 2007/0153780 | A1 | | 7/2007 | Stanley |
| 2008/0187166 | A1 | | 8/2008 | Ko |
| 2008/0215240 | A1 | * | 9/2008 | Howard ................ G06F 3/0488 701/469 |
| 2009/0003619 | A1 | * | 1/2009 | Solow ..................... H04R 1/30 381/77 |
| 2009/0080672 | A1 | | 3/2009 | Smith |
| 2010/0095030 | A1 | * | 4/2010 | Chiu ...................... G06F 3/023 710/67 |
| 2011/0095817 | A1 | | 4/2011 | Yamada |
| 2012/0092185 | A1 | | 4/2012 | Hayashi et al. |
| 2012/0128178 | A1 | * | 5/2012 | Fujii ...................... G10L 21/02 381/98 |
| 2013/0070933 | A1 | * | 3/2013 | Itou ........................ H04R 3/007 381/59 |
| 2013/0314836 | A1 | * | 11/2013 | Christie ............ H03K 17/0822 361/95 |
| 2014/0300455 | A1 | | 10/2014 | Tsuzuki et al. |

FOREIGN PATENT DOCUMENTS

| | | |
|---|---|---|
| CN | 102452354 | 5/2012 |
| EP | 794604 | 9/1997 |
| EP | 2229006 A1 | 9/2010 |
| JP | 6-088870 | 3/1994 |
| JP | 3010357 B | 2/2000 |
| JP | 2000-175299 A | 6/2000 |
| JP | 2003-070098 A | 3/2003 |
| JP | 2004136831 A | 5/2004 |
| JP | 2008-085476 | 4/2008 |
| JP | 2008-244554 | 10/2008 |
| JP | 2011-031865 A | 2/2011 |
| JP | 2011-091642 A | 5/2011 |
| JP | 2012-056400 * | 3/2012 |
| JP | 2012-056400 A | 3/2012 |
| JP | 2013028232 A | 2/2013 |
| NO | 2013118250 A1 | 8/2013 |
| WO | 2009-087772 A1 | 7/2009 |

OTHER PUBLICATIONS

International Search Report issued in PCT/JP2013/004128, dated Oct. 8, 2013, with English translation.
The Extended European Search Report dated Feb. 1, 2016 for the related European Patent Application No. 13812650.3.
International Search Report issued Dec. 16, 2014, in corresponding International Application No. PCT/JP2014/004688.
Chinese Search Report issued Apr. 1, 2017, in corresponding Chinese Patent Application No. 201480051051.5.
Extended European Search Report issued Sep. 21, 2016, in corresponding European Patent Application No. 14845060.4.
Non-final Office Action issued Dec. 2, 2016, in corresponding U.S. Appl. No. 14/916,346.
Final Office Action issued May 31, 2017, in corresponding U.S. Appl. No. 14/916,346.

* cited by examiner

PROXIMITY ALARM DEVICE, PROXIMITY ALARM SYSTEM, MOBILE DEVICE, AND METHOD FOR DIAGNOSING FAILURE OF PROXIMITY ALARM SYSTEM

RELATED APPLICATIONS

This application is the U.S. National Phase under 35 U.S.C. §371 of International Application No. PCT/JP2013/004128, filed on Jul. 3, 2013, which in turn claims the benefit of Japanese Application No. 2012-150097, filed on Jul. 4, 2012, the disclosures of which Applications are incorporated by reference herein.

TECHNICAL FIELD

The present technical field relates to a proximity alarm device for notifying a human, an animal, or the like, of an approach of, for example, a mobile device by issuing an alarming sound or the like during the movement of the mobile device, a proximity alarm system, a mobile device, and a method for diagnosing a failure of a proximity alarm system.

BACKGROUND ART

FIG. 9 is a conceptual diagram of conventional mobile device 7. Proximity alarm device 6 includes control unit 1, amplifying unit 2, and capacitor 3. Loudspeaker unit 4 is electrically connected to an output side of proximity alarm device 6. Proximity alarm device 6 is mounted on mobile device 7.

Control unit 1 receives a vehicle signal and outputs an audio signal. Amplifying unit 2 amplifies the audio signal. An output from amplifying unit 2 is supplied to loudspeaker unit 4 via capacitor 3. Note here that capacitor 3 cuts a DC voltage in the output from amplifying unit 2. With the above-mentioned configuration, proximity alarm device 6 issues alarming sound 8 from loudspeaker unit 4.

Note here that prior art literatures relating to the invention of the present application include, for example, PTL 1.

CITATION LIST

Patent Literature

PTL 1: Japanese Patent Unexamined Publication No. 2011-31865

SUMMARY OF THE INVENTION

A proximity alarm device of the present invention includes a control unit, an amplifying unit, an output terminal, a ground terminal, a first detection unit, and a determining unit. The control unit receives a referencing signal, and outputs an audio signal in response to an input of the referencing signal. The amplifying unit is electrically connected to an output side of the control unit. The output terminal is electrically connected to an output side of the amplifying unit. The ground terminal is electrically connected to a ground. The first detection unit is electrically connected to the output side of the amplifying unit, and outputs a first detection signal based on an output signal from the amplifying unit. The determining unit is electrically connected to an output side of the first detection unit. Then, the determining unit compares the first detection signal output from the first detection unit and a determination reference signal with each other.

With the above-mentioned configuration, abnormality in a connection state of a loudspeaker can be sensed in a state in which the loudspeaker is connected between the output terminal and the ground terminal. As a result, since abnormality that an alarming sound is not output from the loudspeaker can be sensed, collision accident between the mobile device and a pedestrian, a bicycle, or the like, can be prevented.

Furthermore, a method for diagnosing a failure of a proximity alarm system in accordance with the present invention includes outputting an audio signal in response to an input of a referencing signal, amplifying the audio signal, outputting a detection signal based on the amplified audio signal, and comparing the detection signal and a determination reference signal with each other.

With the above-mentioned configuration, abnormality in a connection state of a loudspeaker can be sensed in a state in which the loudspeaker is connected between the output terminal and the ground terminal. As a result, since abnormality that an alarming sound is not output from the loudspeaker can be sensed, collision accident between the mobile device and a pedestrian, a bicycle, or the like, can be prevented.

DESCRIPTION OF EMBODIMENTS

Recently, for environmental protection, mobile devices such as electric vehicles and hybrid cars have been developed and commercialized. However, when the electric vehicles, hybrid cars, or the like, run only by a motor, only a motor sound is generated. A motor rotation sound is extremely small as compared with an engine sound. Therefore, it is difficult for a human to notice an approach of a mobile device. As a result, noticing of the approach of mobile device 301 by a human is delayed, so that a contact accident between the mobile device and a human or other mobile device 301 may occur. Furthermore, a human may be surprised at a sudden approach of mobile device 301, and may fall. Note here that the human may include, for example, a pedestrian, and a driver of a bicycle, a bike, an automobile, or the like.

Figure 9:
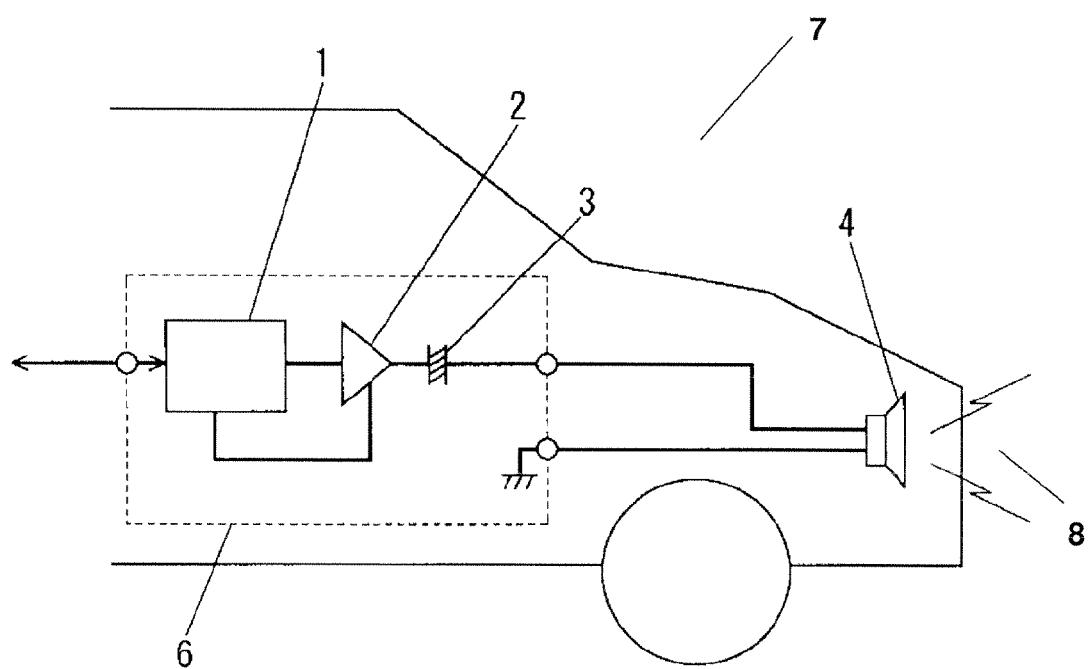
FIG. 9 is a block diagram of a conventional proximity alarm device.

Since proximity alarm device 6 shown in FIG. 9 issues an alarming sound only to the outside of mobile device 7, a driver inside mobile device 7 cannot easily recognize the alarming sound.

When proximity alarm device 6 is in an open state, an audio signal does not propagate to loudspeaker unit 4. Note here that "proximity alarm device 6 being in an open state" means a state in which a circuit is open. For example, it means a case in which a cord connecting between proximity alarm device 6 and loudspeaker unit 4, or a line inside loudspeaker unit 4 is disconnected.

On the other hand, when proximity alarm device 6 is short-circuited to +B, the other power line is linked to proximity alarm device 6 with low resistance, so that an overcurrent flows through proximity alarm device 6 and proximity alarm device 6 may break down. As a result, an audio signal is not output from proximity alarm device 6. Note here that "being short-circuited to +B" means a state in which a voltage of the other power line is applied to proximity alarm device 6. For example, it means a case in which a cord connecting between proximity alarm device 6 and loudspeaker unit 4 is short-circuited to a cord linked to a power supply such as a battery.

However, proximity alarm device 6 cannot detect failures such as an open state or a state of being short-circuited to +B. Therefore, conventional proximity alarm device 6 may not notice that an alarming sound is not output. That is to say, mobile device 7 may run in a state in which an alarming sound is not output.

Figure 1:
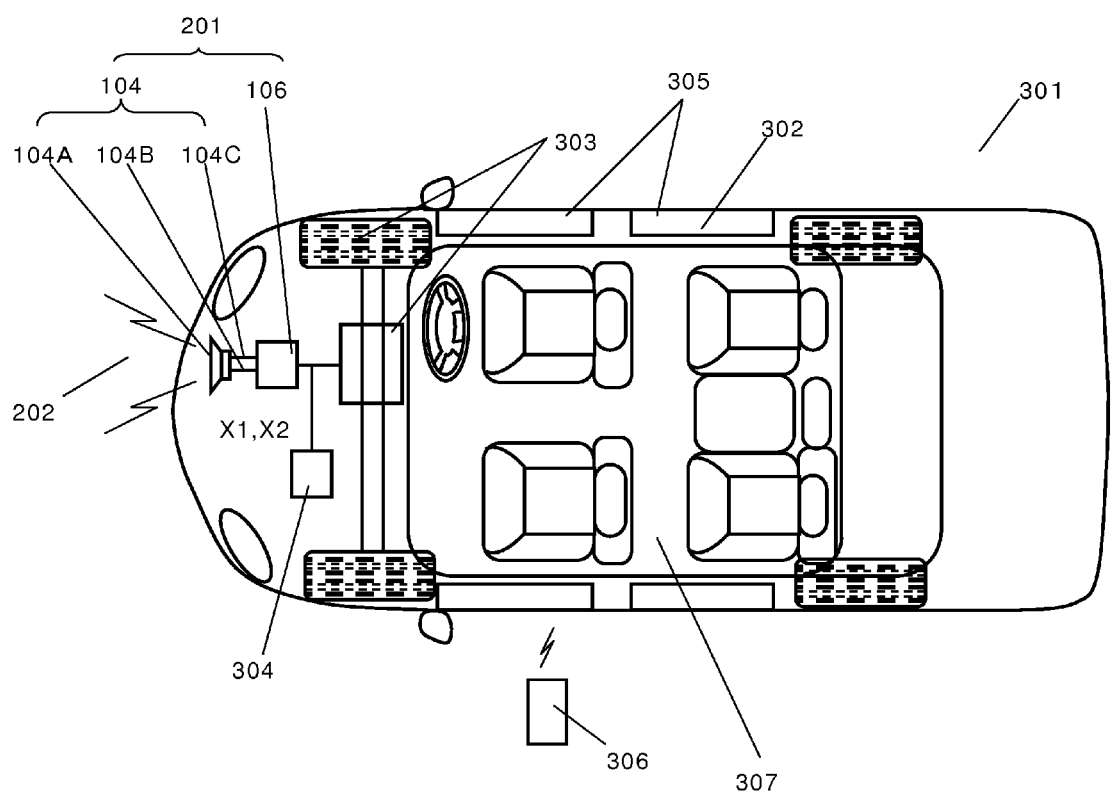
FIG. 1 is a conceptual diagram of a mobile device in accordance with an exemplary embodiment of the present invention.

FIG. 1 is a conceptual diagram of mobile device 301 equipped with proximity alarm device 106 in accordance with an exemplary embodiment of the present invention. Proximity alarm device 106 is mounted on mobile device 301. Mobile device 301 includes main body part 302 provided with space 307, drive unit 303, drive control unit 304, and proximity alarm system 201. Mobile device 301 may further include door 305 and portable device 306. Note here that portable device 306 can give an instruction to lock/unlock the door from a position distant from mobile device 301.

Drive unit 303, drive control unit 304, and proximity alarm system 201 are mounted on main body part 302. Mobile device 301 includes space 307 in main body part 302. Note here that, for example, a driver who drives mobile device 301 rides in space 307.

Drive control unit 304 is electrically connected to drive unit 303 and proximity alarm system 201. Drive control unit 304 outputs a referencing signal to each part of mobile device 301, including drive unit 303 and proximity alarm system 201. As a result, drive unit 303 is controlled by the referencing signal. Note here that drive unit 303 includes a motor. Drive unit 303 may further include an engine or tires. Namely, mobile device 301 is, for example, an electric vehicle, a hybrid car, or the like.

Proximity alarm system 201 includes proximity alarm device 106 and first alarming-sound output unit 104. First alarming-sound output unit 104 is a transducer and converts a signal output from proximity alarm device 106 into alarming sound 202. For example, first alarming-sound output unit 104 may include first loudspeaker 104A, first connection line 104B, and second connection line 104C. First connection line 104B and second connection line 104C electrically connect between proximity alarm device 106 and first loudspeaker 104A. For example, first connection line 104B is a signal line and second connection line 104C is a ground line.

Note here that it is preferable that proximity alarm device 106 includes a connector to be connected to first connection line 104B or second connection line 104C. In this case, first connection line 104B or second connection line 104C includes a connector to be connected to proximity alarm device 106 at a first end thereof. Furthermore, it is preferable that first loudspeaker 104A includes a connector to be connected to first connection line 104B or second connection line 104C. In this case, first connection line 104B or second connection line 104C includes a connector to be connected to first loudspeaker 104A at a second end thereof.

Proximity alarm system 201 notifies a human of an approach of mobile device 301 by outputting an alarming sound from first loudspeaker 104A. Note here that it is preferable that proximity alarm system 201 issues alarming sound 202 when mobile device 301 runs by only a motor.

Furthermore, it is preferable that alarming sound 202 output by proximity alarm system 201 is, for example, a simulated engine sound. As a result, a human can notice that mobile device 301 is approaching to himself/herself without visually recognizing mobile device 301.

Figure 2:
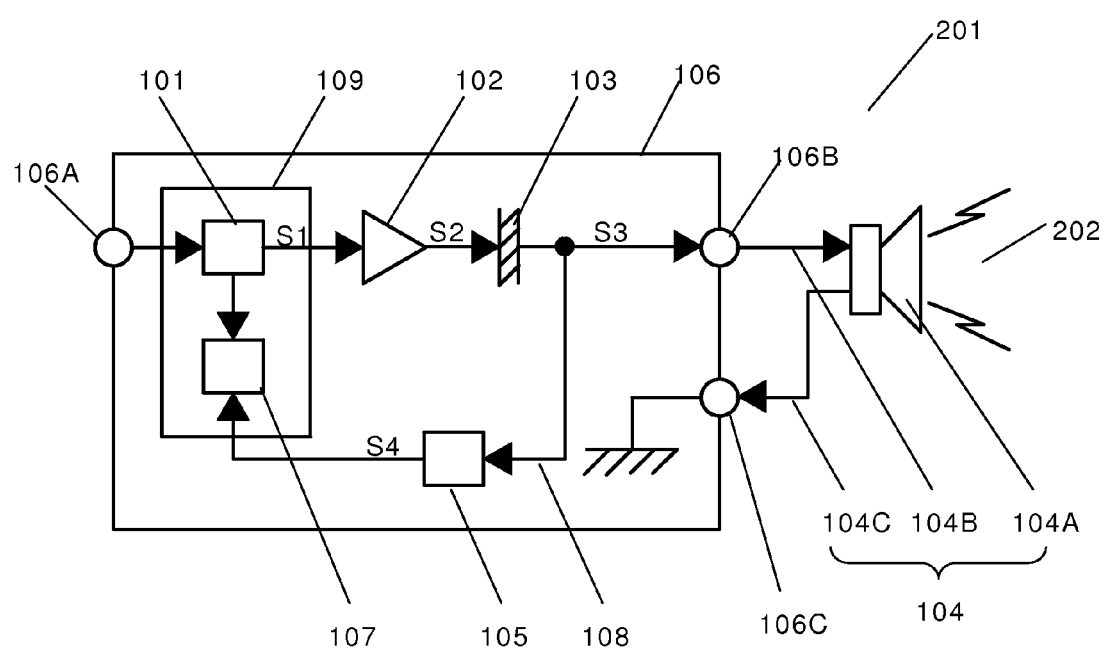
FIG. 2 is a block diagram of a proximity alarm system in accordance with the exemplary embodiment of the present invention.

FIG. 2 is a block diagram of proximity alarm system 201 using proximity alarm device 106 in accordance with an exemplary embodiment of the present invention. Proximity alarm device 106 includes input terminal 106A, output terminal 106B, ground terminal 106C, control unit 101, amplifying unit 102, capacitor 103, first detection unit 105, and determining unit 107. Control unit 101 receives a referencing signal input from input terminal 106A, and outputs audio signal S1 in response to the received referencing signal. Amplifying unit 102 is electrically connected to an output side of control unit 101. Amplifying unit 102 amplifies input audio signal S1 and outputs audio signal S2. Output terminal 106B is electrically connected to an output side of amplifying unit 102. Ground terminal 106C is electrically connected to a ground.

Furthermore, it is preferable to include capacitor 103 connected in series between the output side of amplifying unit 102 and output terminal 106B. Capacitor 103 is connected in series to amplifying unit 102. Audio signal S2 includes audio signal S3 as an AC component, and a DC signal component. Since audio signal S3 is alternating, it can pass through capacitor 103. Capacitor 103 prevents the DC signal component from being output to first loudspeaker 104A.

First alarming-sound output unit 104 is electrically connected between output terminal 106B and ground terminal 106C. As a result, first alarming-sound output unit 104 receives audio signal S3 output from proximity alarm device 106. Then, first alarming-sound output unit 104 converts audio signal S3 into alarming sound 202, and outputs alarming sound 202 to the outside of mobile device 301.

First detection unit 105 is electrically connected to the output side of amplifying unit 102. It is preferable that first detection unit 105 is connected to output terminal 106B side of capacitor 103. Note here that first detection unit 105 may be connected to the front side from capacitor 103. First detection unit 105 outputs first detection signal S4 based on the output signal of amplifying unit 102. Determining unit 107 is electrically connected to the output side of first detection unit 105. Determining unit 107 compares first detection signal S4 and a determination reference signal with each other.

With the above-mentioned configuration, proximity alarm device 106 can diagnose a failure of proximity alarm system 201. For example, proximity alarm device 106 can diagnose a state in which a signal line is open (disconnected), a short circuit to the other power line (+B), and a short circuit to the ground, between amplifying unit 102 to the ground.

When a driver who drives mobile device 301 is notified of diagnosis result diagnosed by proximity alarm device 106, the driver can notice a failure of proximity alarm system 201 quickly. Therefore, the safety of mobile device 301 equipped with proximity alarm system 201 can be improved.

Next, a configuration and an operation of proximity alarm device 106 are described in more detail with reference to drawings. Firstly, the configuration of control unit 101 is described with reference to FIG. 2. Control unit 101 stores sound source data as a source of audio signal S1. The sound source data are digital signals. The sound source data may be artificially produced by, for example, digital processing of alarming sound 202 simulating an engine sound. Alternatively, the sound source data may be produced by collecting an actual engine sound and converting the collected engine sound into a digital signal. Control unit 101 converts the sound source data into an analog signal based on the referencing signal to generate audio signal S1. As a result, control unit 101 can output audio signal S1 to amplifying unit 102.

Note here that it is preferable that the sound source data are stored in a state in which they are compressed in a defined manner. Thus, the storage capacity inside control unit 101 can be reduced. In this case, control unit 101 decompresses the sound source data and then converts them into an analog signal.

In this way, control unit 101 outputs audio signal S1 when it senses the referencing signal. Note here that it is preferable that the referencing signal is signal X1 with which the start of the movement of mobile device 301 shown in FIG. 1 can be sensed. Examples of the referencing signal may include a signal indicating an angle at which an accelerator pedal is stepped into, a signal indicating that a mobile is in a running state, a signal indicating a movement speed of mobile device 301, or the like. Note here that for the referencing signal, any one of these signals may be used. Alternatively, for the referencing signal, two or more of these signals may be used. In this case, control unit 101 outputs audio signal S1 when it senses any of these referencing signals.

With this configuration, based on the referencing signal, control unit 101 can sense that the movement of mobile device 301 starts. Then, control unit 101 outputs audio signal S1 when it senses that the movement of mobile device 301 starts. As a result, proximity alarm system 201 starts to output alarming sound 202 at substantially the same time when mobile device 301 shown in FIG. 1 starts to run.

Note here that a referencing signal to be used by control unit 101 for outputting audio signal S1 is not limited to the above-mentioned signal. Signal X2 may be used, which is output by drive control unit 304 shown in FIG. 1 before a driver moves mobile device 301. Examples of the reference signal to be used include a signal for unlocking door 305, an ignition signal (a signal for starting a motor), a signal indicating that a foot brake is released, a signal indicating that a side brake is released, or a signal indicating that a shift lever is in drive, a signal for controlling the rotation of a motor, and the like. Furthermore, the referencing signal may be a signal which is not directly generated by drive control unit 304. For example, it is possible to use a signal that is required to unlock door 305 from portable device 306.

Note here that any one of these signals may be used as the referencing signal. Furthermore, the referencing signal is not limited to one, and a plurality of signals of the above-mentioned signals may be used as the referencing signal. In this case, when control unit 101 senses any one of these referencing signals, control unit 101 outputs audio signal S1. Alternatively, when control unit 101 senses a plurality of these referencing signals, control unit 101 outputs audio signal S1.

Figure 3:
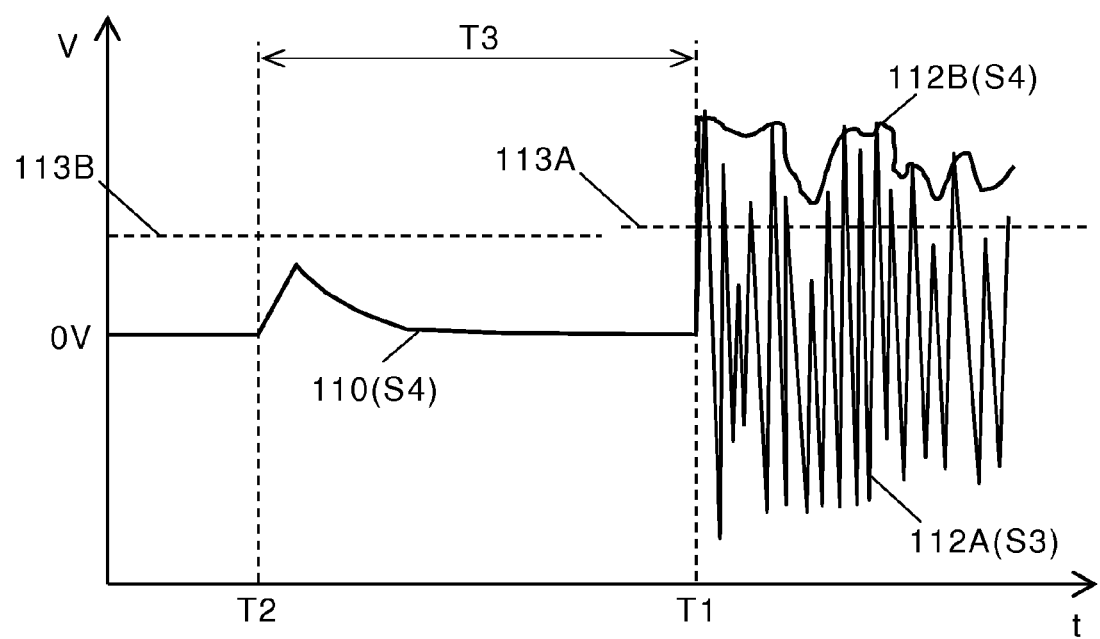
FIG. 3 is a voltage characteristic graph showing an operation of the proximity alarm device in accordance with the exemplary embodiment of the present invention.

Next, configurations and operations of first detection unit 105 and determining unit 107 are described with reference to FIGS. 3 to 6. FIG. 3 is a voltage characteristic graph of proximity alarm device 106 when proximity alarm system 201 operates normally. In FIG. 3, the abscissa shows time and the ordinate shows voltage.

Firstly, configurations and operations of first detection unit 105 and determining unit 107 when proximity alarm system 201 shown in FIG. 2 normally operates are described. A power supply is applied to amplifying unit 102 at time T2 based on the referencing signal. When amplifying unit 102 is turned on, a direct current by an offset voltage flows to the output of amplifying unit 102. When first alarming-sound output unit 104 is electrically connected to proximity alarm device 106 in a normal state, first alarming-sound output unit 104 becomes a load. Therefore, when amplifying unit 102 is turned on, a voltage on line 108 is momentarily increased. As a result, first detection unit 105 outputs first detection signal S4 having voltage waveform 110 to determining unit 107.

Determining unit 107 compares first detection signal S4 and determination reference signal 113B with each other. In this case, determining unit 107 may sense a maximum value of first detection signal S4, and compare the maximum value and determination reference signal 113B with each other. Alternatively, determining unit 107 may compare first detection signal S4 and determination reference signal 113B with each other every time determining unit 107 obtains first detection signal S4. Note here that determination reference signal 113B is a threshold value used by proximity alarm device 106 for diagnosing a short circuit to GND. In this case, when all of first detection signals S4, which are obtained during predetermined period of time T3, are not higher than determination reference signal 113B, it can be determined that a maximum voltage of first detection signal S4 is not higher than determination reference signal 113B.

With this configuration, during a time from time T2 to a time when period of time T3 has passed, determining unit 107 compares sensed first detection signal S4 and determination reference signal 113B with each other. Then, when a maximum voltage of first detection signal S4 is not more than determination reference signal 113B, determining unit 107 can diagnose that proximity alarm system 201 normally operates.

In order for first detection unit 105 to correctly sense the maximum value of voltage waveform 110, it is preferable that audio signal S1 is output after period of time T3 has passed from time T2. That is to say, if control unit 101 outputs audio signal S1 before period of time T3 has passed, determining unit 107 may not be able to sense first detection signal S4 having voltage waveform 110 by audio signal S1. Therefore, it is preferable that control unit 101 does not output a signal during period of time T3. Thus, it is preferable that control unit 101 outputs audio signal S1 with period of time T3 or longer delayed. As a result, during period of time T3, a voltage of line 108 can be set at 0 V.

Drive control unit 304 shown in FIG. 1 outputs signal X1 after mobile device 301 starts to move. Drive control 304 outputs signal X2 before mobile device 301 starts to move. Thus, it is preferable that control unit 101 outputs audio signal S1 based on signal X2 in the referencing signals. In this case, it is preferable that amplifying unit 102 is turned on based on signal X1 in the referencing signals. Since the period of time between signal X1 and signal X2 is generally not shorter than period of time T3, after first detection unit 105 completes sensing of a maximum value of voltage waveform 110, control unit 101 outputs audio signal S1.

Note here that amplifying unit 102 may be turned on based on signal X2. Alternatively, control unit 101 may output audio signal S1 based on signal X1. In such cases, however, a referencing signal to be referred to for turning on amplifying unit 102 and a referencing signal to be referred to for outputting audio signal S1 by control unit 101 are made to be different from each other. Furthermore, it is preferable that the referencing signal to be referred to for turning on amplifying unit 102 is output from drive control unit 304 earlier by period of time T3 than the referencing signal to be referred to for outputting audio signal S1 by control unit 101.

Furthermore, it is preferable that control unit 101 generates audio signal S1 from the sound source data after the referencing signal is input. With this configuration, a time at which audio signal S1 is output can be further delayed by a time necessary for processing to generate audio signal S1 from the sound source data.

With this configuration, determining unit 107 can determine a maximum value of first detection signal S4 having voltage waveform 110 without being disturbed by audio signal S1.

Control unit 101 shown in FIG. 2 outputs audio signal S1 at time T1. It is preferable that time T1 is a time at which the period of time T3 or more has passed from time T2. When proximity alarm system 201 operates normally, for example, audio signal S3 having voltage waveform 112A shown in FIG. 3 is input to first detection unit 105. First detection unit 105 shown in FIG. 2 detects audio signal S3. As a result, first detection unit 105 outputs, for example, first detection signal S4 having voltage waveform 112B shown in FIG. 3 to determining unit 107.

Therefore, first detection unit 105 may include a wave-detector. In this case, first detection unit 105 wave-detects audio signal S3 and outputs a direct current first detection signal S4.

Determining unit 107 shown in FIG. 2 compares first detection signal S4 and determination reference signal 113A with each other. Determination reference signal 113A is a threshold value which is used by proximity alarm device 106 for diagnosing a failure in an open state. Then, determining unit 107 diagnoses that proximity alarm system 201 operates normally when the size of first detection signal S4 is a value not lower than determination reference signal 113A.

Figure 4:
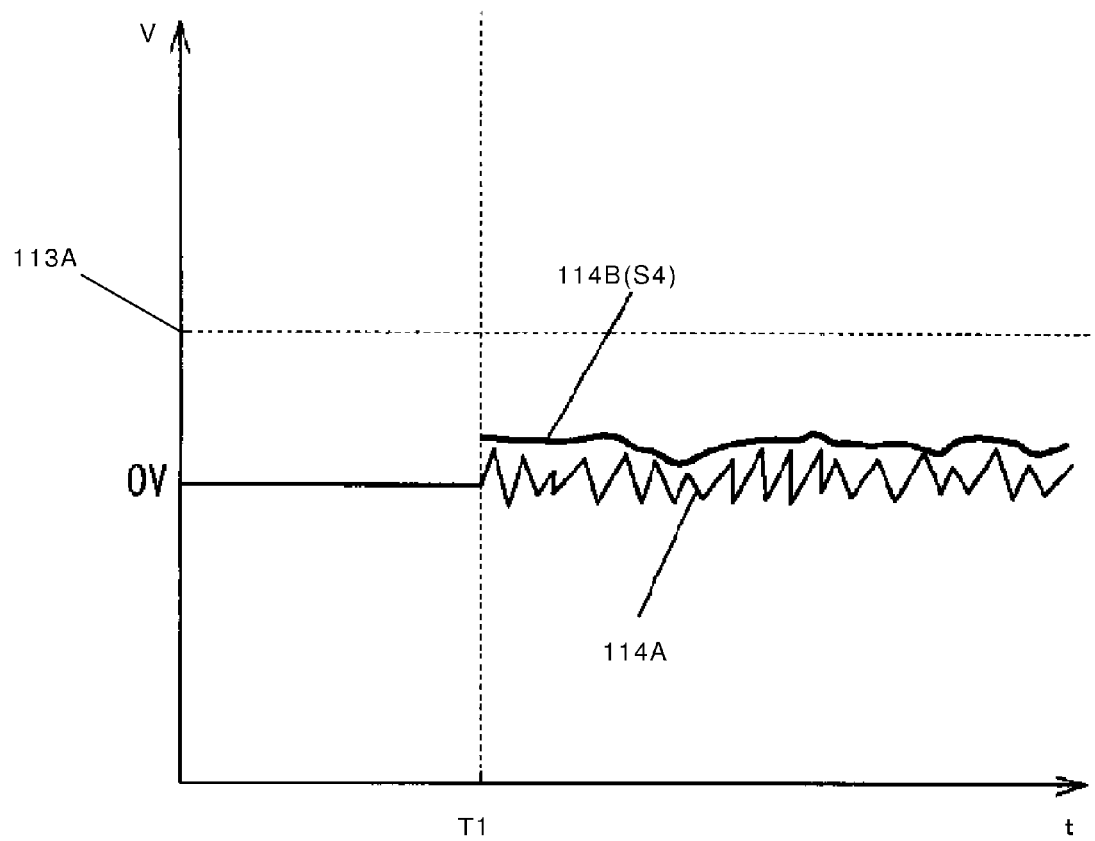
FIG. 4 is a voltage characteristic graph of the proximity alarm device in accordance with the exemplary embodiment of the present invention.
Figure 5:
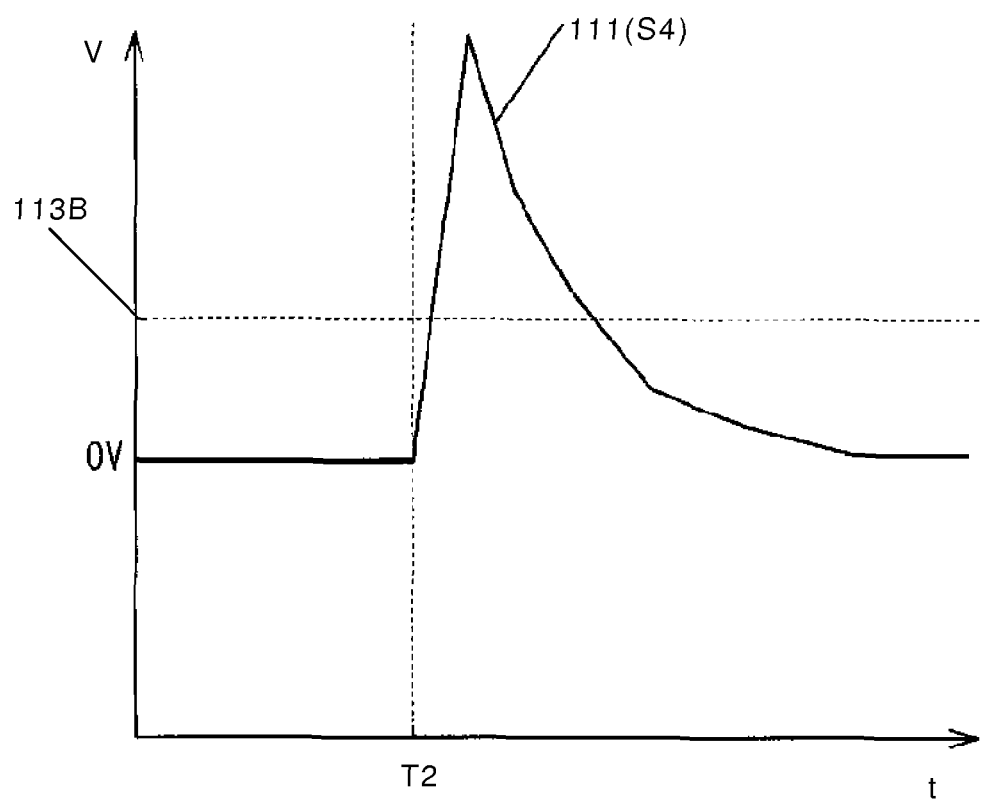
FIG. 5 is a voltage characteristic graph of the proximity alarm device in accordance with the exemplary embodiment of the present invention.
Figure 6:
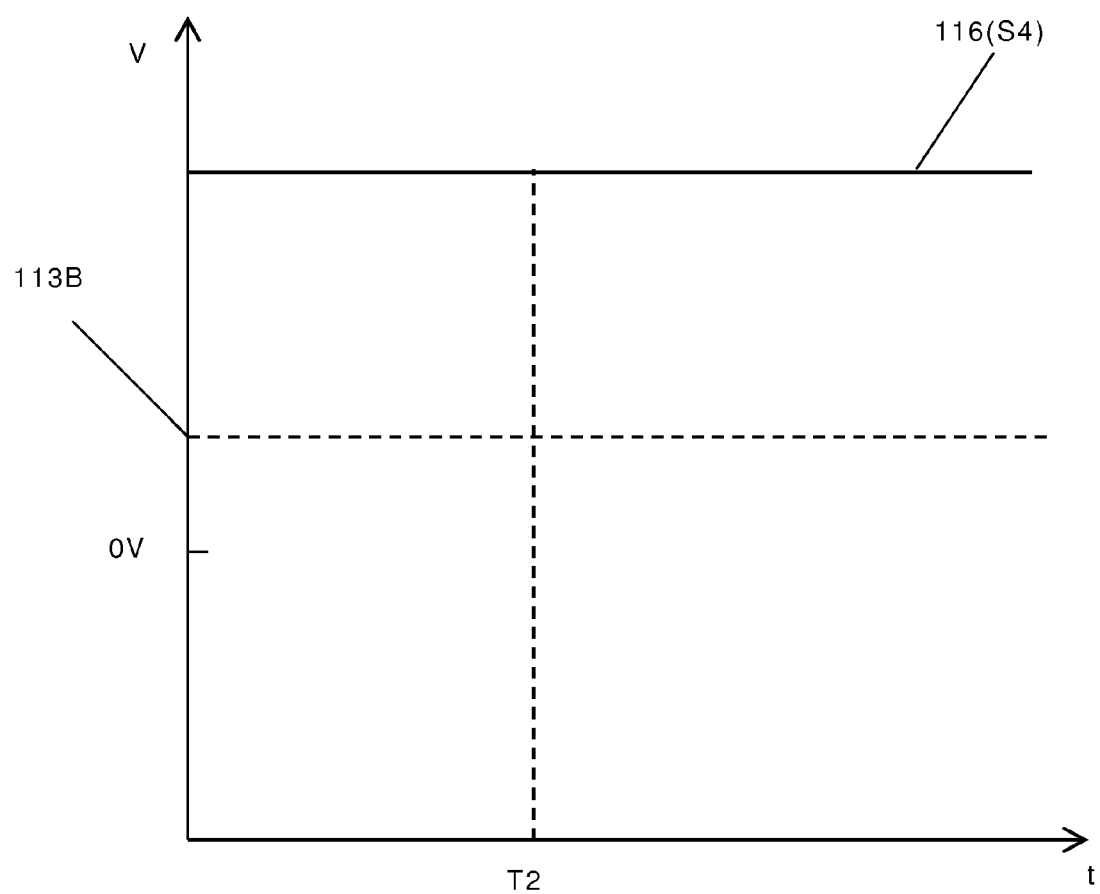
FIG. 6 is a voltage characteristic graph of the proximity alarm device in accordance with the exemplary embodiment of the present invention.

Next, a method for judging that proximity alarm device 106 is in failure is described with reference to drawings. FIGS. 4 to 6 are voltage characteristic graphs of proximity alarm device 106 when proximity alarm system 201 is in failure. In FIGS. 4 to 6, the abscissa shows a time, and the ordinate shows a voltage. Firstly, a method by which proximity alarm device 106 diagnoses a state of being short-circuited to GND is described with reference to FIG. 4. For example, when first connection line 104B is short-circuited to a ground, line 108 that supplies first detection unit 105 with audio signal S3 is electrically connected to GND. Therefore, as shown in voltage waveform 114A of FIG. 4, a signal level of audio signal S3 is suppressed. As a result, first detection unit 105 outputs first detection signal S4 having voltage waveform 114B to determining unit 107.

Determining unit 107 shown in FIG. 2 compares first detection signal S4 and determination reference signal 113A with each other. Then, determining unit 107 can diagnose that the output side of amplifying unit 102 is short-circuited to the ground when the size of first detection signal S4 is determined to be smaller than determination reference signal 113A.

Next, a method for diagnosing a failure in a state in which proximity alarm device 106 is opened and short-circuited to +B is described. A failure in an open state occurs, for example, when first alarming-sound output unit 104 is not connected to proximity alarm device 106. In this case, first alarming-sound output unit 104 does not become a load of proximity alarm device 106. Therefore, a maximum value of a voltage of line 108 becomes larger as compared with a state in which proximity alarm system 201 is normal. As a result, first detection unit 105 outputs first detection signal S4 having voltage waveform 111 shown in FIG. 5 to determining unit 107.

Determining unit 107 compares first detection signal S4 and determination reference signal 113B with each other. When determining unit 107 determines that a maximum voltage of first detection signal S4 is larger than determination reference signal 113B, determining unit 107 can diagnose that proximity alarm system 201 is in failure in an open state.

On the other hand, a failure of being short-circuited to +B occurs when, for example, first connection line 104B is short-circuited to a line connected to a power supply of a car battery. In this case, line 108 is linked to the line connected to the power supply of the car battery with low resistance. Therefore, an overcurrent flows through line 108, and a voltage of line 108 becomes high. Therefore, as shown in FIG. 6, a value of first detection signal S4 becomes upper limit voltage value 116 substantially at the same time as the time when amplifying unit 102 is turned on. In this case, also thereafter, first detection signal S4 is kept at upper limit voltage value 116.

Determining unit 107 can diagnose that proximity alarm system 201 is in a failure state of being short-circuited to +B when a maximum voltage of first detection signal S4 reaches upper limit voltage value 116.

Furthermore, it is preferable that determining unit 107 observes first detection signal S4 for a defined time. In this case, determining unit 107 can diagnose a failure in an open state when it is detected that a voltage of line 108 becomes substantially 0 V in the defined time. On the other hand, determining unit 107 can diagnose a failure in a state of being short-circuited to +B when it is detected that first detection signal S4 is kept at upper limit voltage value 116 during the defined time.

With this configuration, proximity alarm device 106 can diagnose a failure in an open state, a state of being short-circuit to GND, and a state of being short-circuit to +B. Therefore, proximity alarm device 106 can detect various failures that alarming sound 202 is not output from first alarming-sound output unit 104 due to a failure of proximity alarm system 201. As a result, quality and reliability of proximity alarm system 201 are enhanced. Furthermore, it is possible to prevent collision accident between mobile device 301 and a human, or the like, in advance. Furthermore, since proximity alarm device 106 can be configured with a simple circuit, the cost can be reduced.

Note here that control unit 101 may output a signal indicating the presence or absence of an output of audio signal S1. It is preferable that determining unit 107 receives the signal indicating the presence or absence of the output of audio signal S1. In this case, it is preferable that determining unit 107 compares first detection signal S4 having voltage waveform 110 and determination reference signal 113B with each other when determining unit 107 senses a signal indicating the absence of the output of audio signal S1. It is preferable that determining unit 107 compares determination reference signal 113A with first detection signal S4 having voltage waveform 112B or voltage waveform 114A when determining unit 107 senses a signal indicating that audio signal S1 is output.

Figure 7:
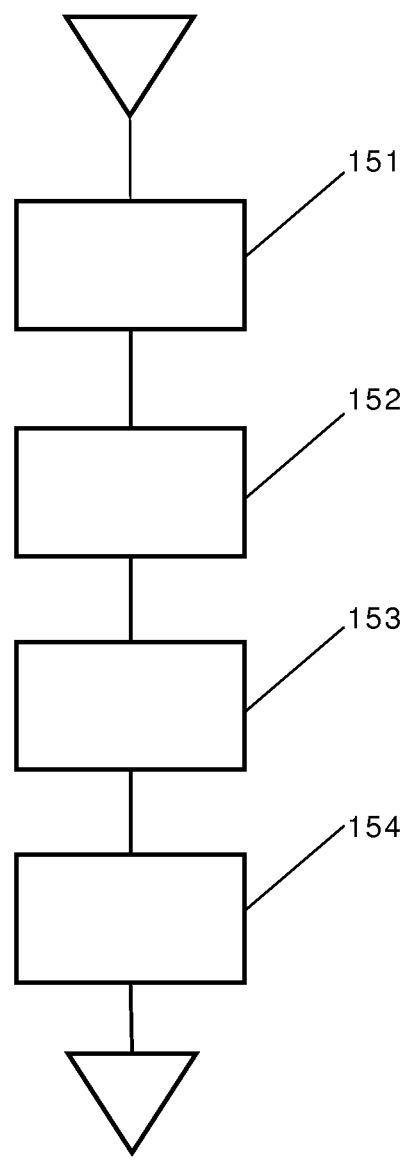
FIG. 7 is a flowchart of control of the proximity alarm device in accordance with the exemplary embodiment of the present invention.

FIG. 7 is a flowchart of control of proximity alarm device 106. A method for diagnosing a failure of proximity alarm device 106 of the present invention includes step 151 of outputting audio signal S1 in response to an input of a referencing signal, step 152 of amplifying audio signal S1, step 153 of outputting first detection signal S4 based on amplified audio signal S3, and step 154 of comparing between first detection signal S4 and determination reference signal 113A or between first detection signal S4 and determination reference signal 113B.

Step 151 carries out processing of control unit 101. Step 152 carries out processing of amplifying unit 102. Step 153 carries out processing of first detection unit 105. Step 154 carries out processing of determining unit 107. Note here that it is preferable that control unit 101 and determining unit 107 are configured inside signal processing device 109. In this case, step 151 or step 154 can be executed by software.

Figure 8:
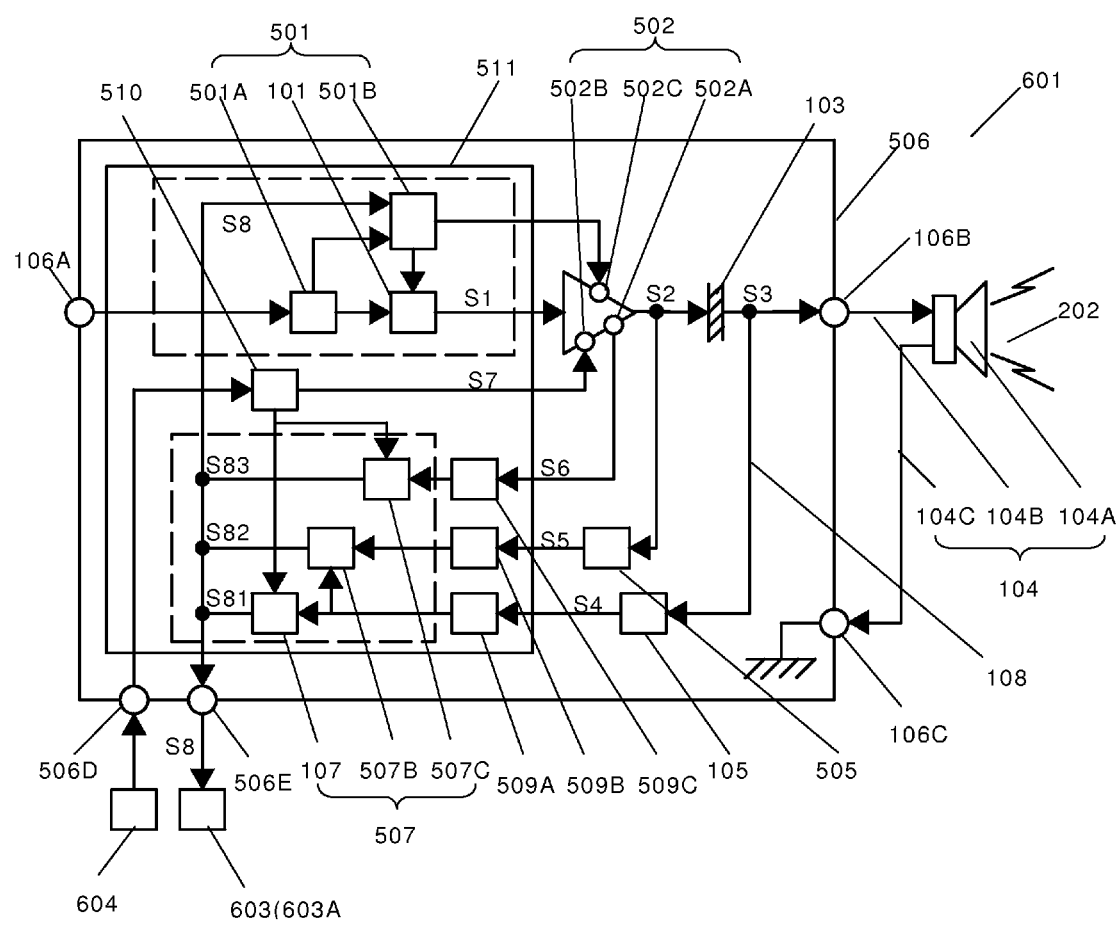
FIG. 8 is a block diagram of a proximity alarm system in another example of the exemplary embodiment of the present invention.

FIG. 8 is a block diagram of proximity alarm system 601 in another example of the exemplary embodiment of the present invention. Proximity alarm system 601 includes proximity alarm device 506 instead of proximity alarm device 106 of proximity alarm system 201 shown in FIG. 2. Furthermore, it is preferable that proximity alarm system 601 includes notifying unit 603 and input device 604.

Proximity alarm device 506 includes input terminal 106A, output terminal 106B, ground terminal 106C, input section 506D, informing terminal 506E, signal generating unit 501, amplifying unit 502, capacitor 103, first detection unit 105, second detection unit 505, AD converter 509A, AD converter 509B, AD converter 509C, and determining unit 507.

Amplifying unit 502 includes monitor terminal 502A, gain control terminal 502B, and power supply terminal 502C. Note here that monitor terminal 502A outputs voltage value S6 proportional to an electric current flowing through amplifying unit 502. In amplifying unit 502, the amplification gain is changed in response to control signal S7 input into gain control terminal 502B.

Determining unit 507 includes determining unit 107, second determining apparatus 507B, and third determining apparatus 507C. Note here that proximity alarm device 506 may further include a setting unit.

Signal generating unit 501 includes sensing unit 501A, power supply control unit 501B, and control unit 101. A referencing signal supplied to input terminal 106A is input into sensing unit 501A. An output side of sensing unit 501A is electrically connected to control unit 101 and power supply control unit 501B. When sensing unit 501A senses an input of a referencing signal, sensing unit 501A outputs a signal indicating that a referencing signal is sensed to control unit 101 and power supply control unit 501B.

It is preferable that the output side of power supply control unit 501B is connected to power supply terminal 502C of amplifying unit 502. The output side of control unit 101 is electrically connected to amplifying unit 502. An output signal of amplifying unit 502 is supplied to output terminal 106B and first detection unit 105 via capacitor 103. It is further preferable that the output side of power supply control unit 501B is connected to an input side of control unit 101.

The output side of first detection unit 105 is electrically connected to determining unit 107 and second determining apparatus 507B via AD converter 509A. An amplifying unit 502 side of capacitor 103 is electrically connected to second detection unit 505. The output side of second detection unit 505 is electrically connected to second determining apparatus 507B via AD converter 509B. With this configuration, second detection unit 505 can sense the size of audio signal S2. Namely, second detection unit 505 can detect a voltage in a front side of capacitor 103. Second detection unit 505 outputs second detection signal S5 corresponding to a level of audio signal S2. Then, second determining apparatus 507B compares first detection signal S4 and second detection signal S5 with each other. With this configuration, second determining apparatus 507B can diagnose that capacitor 103 is short-circuited when it is determined that the size of first detection signal S4 and the size of second detection signal S5 are equal to each other.

Monitor terminal 502A is electrically connected to the input side of third determining apparatus 507C via AD converter 509C. Third determining apparatus 507C compares voltage value S6 output from monitor terminal 502A and a predetermined threshold value with each other. Then, third determining apparatus 507C diagnoses that an overcurrent flows in amplifying unit 502 when it is determined that a value of the voltage output from monitor terminal 502A is larger than the threshold value.

The output sides of determining unit 107, second determining apparatus 507B, and third determining apparatus 507C are electrically connected to power supply control unit 501B and informing terminal 506E. Notifying unit 603 is electrically connected to informing terminal 506E.

With this configuration, determining unit 107, second determining apparatus 507B, and third determining apparatus 507C output each determination result to power supply control unit 501B and notifying unit 603. Note here that determining unit 107, second determining apparatus 507B, and third determining apparatus 507C output signal S8 indicating that proximity alarm system 601 is in failure when it is determined that proximity alarm system 601 is in failure. Note here that it is preferable that signal S8 includes signal S81 output by determining unit 107, signal S82 output by second determining apparatus 507B, and signal S83 output by third determining apparatus 507C. As described with reference to FIGS. 4 to 6, signal S81 can determine which failure among a failure in an open state, a failure in a state of being short-circuited to the ground, and a failure in a state of being short-circuited to +B.

It is preferable that when power supply control unit 501B receives signal S8 indicating a failure, it stops supply from the power supply to amplifying unit 502. Furthermore, it is further preferable that proximity alarm device 506 stops the output of audio signal S1 from control unit 101 when power supply control unit 501B is connected to control unit 101. Therefore, proximity alarm device 506 may stop supply of a power supply with which control unit 101 is supplied.

Therefore, when proximity alarm system 601 is in failure because an overcurrent flows through amplifying unit 502, it is possible to prevent an overcurrent from continuing to flow through amplifying unit 502. Alternatively, when proximity alarm system 601 is in failure because capacitor 103 is short-circuited, it is possible to prevent a direct current component contained in audio signal S2 from being supplied to first loudspeaker 104A. Therefore, it is possible to prevent the failure of first loudspeaker 104A.

On the other hand, when notifying unit 603 receives signal S8 indicating a failure, it notifies, for example, a driver of diagnosis results of determining unit 507. Note here that since notifying unit 603 can determine which part is in failure by signal S81, signal S82, and signal S83, notifying corresponding to the failure can be carried out.

As notifying unit 603, second loudspeaker 603A may be used. Namely, proximity alarm system 601 may further include second loudspeaker 603A in addition to first loudspeaker 104A. In this case, second loudspeaker 603A is disposed in main body part 302 such that an information sound can be output to space 307 shown in FIG. 1.

With this configuration, second loudspeaker 603A can notify, for example, a driver of a failure by a sound. Therefore, this configuration does not require visual recognition by a driver. As a result, regardless of directions of the field of view of a driver, a failure can be recognized.

Alternatively, notifying unit 603 may be indicator 603B for displaying a failure by emitting light, or the like. With this configuration, even while a driver listens to music or the like, the driver can recognize a failure of proximity alarm system 601.

Furthermore, notifying unit 603 may include both second loudspeaker 603A and indicator 603B. This configuration makes it easier for a driver to recognize a failure of proximity alarm system 601.

First loudspeaker 104A is disposed inside a motor room disposed in the front side of mobile device 301 shown in FIG. 1. However, in mobile devices 301 in different types, places at which first loudspeaker 104A can be disposed may be different from each other. For example, when first loudspeaker 104A is disposed distant from the front end portion of mobile device 301, a sound amount of alarming sound 202 listened to by a human is reduced.

Thus, it is preferable that proximity alarm device 506 is provided with setting unit 510. Input device 604 is electrically connected to input section 506D. Input section 506D is electrically connected to an input side of setting unit 510. The output side of setting unit 510 is electrically connected to the input sides of gain control terminal 502B, determining unit 107, and third determining apparatus 507.

With this configuration, setting unit 510 can control an amplification degree of amplifying unit 502 in response to set values input into input device 604. Setting unit 510 can output determination reference signal 113A and determination reference signal 113B, corresponding to the amplification degree of amplifying unit 502, to determining unit 107. Furthermore, setting unit 510 can output a threshold value of third determining apparatus 507C, corresponding to the amplification degree of amplifying unit 502, to third determining apparatus 507C. Therefore, even if positions at which first loudspeaker 104A is disposed are different due to, for example, difference in types of cars, alarming sound 202 output to the outside of the car can be set to a predetermined size.

It is preferable that AD converter 509A, AD converter 509B, and AD converter 509C sample 100 data from first detection signal S4 for 10 msec. Furthermore, it is preferable that determining unit 107, second determining apparatus 507B, and third determining apparatus 507C calculate an average of the 100 sampled data. This configuration makes the data not susceptible to momentary noise or the like. Therefore, quality and reliability of the proximity alarm device can be further enhanced.

Note here that it is preferable that amplifying unit 502 is provided with a circuit for limiting an electric current flowing through amplifying unit 502. This configuration makes it possible to suppress flowing of an overcurrent through amplifying unit 502. Therefore, it is possible to suppress destruction of amplifying unit 502.

A method for diagnosing a failure proximity alarm device 506 includes steps 151, 152, 153, and 154 shown in FIG. 7.

Step 151 carries out processing of sensing unit 501A and power supply control unit 501B in addition to control unit 101. Note here that it is preferable that step 151 carries out setting unit 510 and input section 506D. Furthermore, step 151 may carry out processing of input device 604.

Step 152 carries out processing of amplifying unit 502. Step 153 carries out processing of second detection unit 505 in addition to the processing of first detection unit 105. Step 154 carries out processing of second determining apparatus 507B, third determining apparatus 507C, AD converter 509A, AD converter 509B, and AD converter 509C in addition to the processing of determining unit 107. Note here that step 154 may carry out processing of notifying unit 603.

Note here that it is preferable that signal generating unit 501, determining unit 507 and setting unit 510 are configured in signal processing device 511. In this case, signal generating unit 501, determining unit 507 and setting unit 510 can be configured by software.

Furthermore, step 151 in the method for diagnosing a failure of proximity alarm device 506 may carry out processing of setting unit 510.

INDUSTRIAL APPLICABILITY

A proximity alarm device in accordance with the present invention is useful for electric vehicles, hybrid cars, or the like, which run by a motor.

REFERENCE MARKS IN THE DRAWINGS 1 control unit
2 amplifying unit
3 capacitor
4 loudspeaker unit
6 proximity alarm device
7 mobile device
8 alarming sound
101 control unit
102 amplifying unit
103 capacitor
104 first alarming-sound output unit
104A first loudspeaker
104B first connection line
104C second connection line
105 first detection unit
106 proximity alarm device
106A input terminal
106B output terminal
106C ground terminal
106D input section
107 determining unit
108 line
109 signal processing device
110 voltage waveform
111 voltage waveform
112A voltage waveform
112B voltage waveform
113A determination reference signal
113B determination reference signal 114A voltage waveform
114B voltage waveform
116 upper limit voltage value
151 step
152 step
153 step
154 step
201 proximity alarm system
202 alarming sound
301 mobile device
302 main body part
303 drive unit
304 drive control unit
305 door
306 portable device
307 space
501 signal generating unit
501A sensing unit
501B power supply control unit
502 amplifying unit
502A monitor terminal
502B gain control terminal
502C power supply terminal
505 second detection unit
506 proximity alarm device
506D input section
506E informing terminal
507 determining unit
507B second determining apparatus
507C third determining apparatus
509A AD converter
509B AD converter
509C AD converter
510 setting unit
511 signal processing device
601 proximity alarm system
603 notifying unit
604 input device

The invention claimed is:

1. A proximity alarm device to be connected to an external loudspeaker, the proximity alarm device comprising:
a control unit configured to receive a referencing signal and to output an audio signal in response to an input of the referencing signal;
an amplifying unit electrically connected to an output side of the control unit for amplifying the audio signal and outputting the amplified audio signal;
an output terminal configured to be connected to the external loudspeaker;
a capacitor connected in series between the amplifying unit and the output terminal;
a ground terminal electrically connected to a ground, the ground terminal being configured to be connected to the external loudspeaker;
a first detection unit electrically connected to a path between an output side of the capacitor and the output terminal, and outputting a first detection signal based on an output signal of the capacitor,
a second detection unit electrically connected to a path between an output side of the amplifying unit and an input side of the capacitor, the second detection unit being configured to sense a size of an output signal of the amplifying unit and to output a second detection signal based on the output signal of the amplifying unit, corresponding to a level of the audio signal;
a determining unit electrically connected to an output side of the first detection unit and comparing a voltage amplitude of the first detection signal output from the first detection unit and a voltage amplitude of a first determination reference signal with each other;
a first AD converter provided between the first detection unit and the determining unit; and
a second AD converter provided between the second detection unit and the determining unit, wherein:
an output side of the second detection unit is electrically connected to the determining unit, and the determining unit further compares the voltage amplitude of the first detection signal output from the first detection unit and a voltage amplitude of the second detection signal output from the second detection unit with each other.

2. The proximity alarm device of claim 1, wherein the first detection unit includes a wave-detector that wave-detects the audio signal and outputs a direct current signal based on the audio signal.

3. The proximity alarm device of claim 1, further comprising:
an input section for receiving a setting of an amplification degree of the amplifying unit; and
a setting unit electrically connected to the determining unit and the amplifying unit, setting the amplification degree of the amplifying unit based on the setting received at the input section, and changing a value of the determination reference signal into a value corresponding to the amplification degree.

4. The proximity alarm device of claim 1, wherein:
the first AD converter samples 100 first data from a signal detected by the first detection unit for 10 msec,
the second AD converter samples 100 second data from a signal detected by the second detection unit for 10 msec, and
the determining unit calculates an average value of the 100 sampled first data and an average value of the 100 sampled second data.

5. The proximity alarm device of claim 1, wherein the amplifying unit includes a monitor terminal for outputting a voltage value proportional to an electric current flowing through the amplifying unit, the monitor terminal being connected to an input side of the determining unit, and
the determining unit compares the voltage value and a predetermined threshold value with each other.

6. The proximity alarm device of claim 5, wherein when the voltage value is larger than the threshold value, the determining unit determines that an overcurrent flows through the amplifying unit.

7. The proximity alarm device of claim 1, further comprising:
a sensing unit connected to an input side of the control unit; and
a power supply control unit connected to an output side of the sensing unit and the amplifying unit.

8. The proximity alarm device of claim 7, wherein the control unit outputs the audio signal to the amplifying unit with a delay based on an output of the sensing unit.

9. A proximity alarm system comprising:
the proximity alarm device as defined in claim 1; and
a first loudspeaker, as the external loudspeaker, electrically connected between the output terminal of the proximity alarm device and the ground terminal.

10. The proximity alarm system of claim 9, further comprising a notifying unit electrically connected to the determining unit provided to the proximity alarm device and notifying a determination result by the determining unit.

11. The proximity alarm system of claim 10, wherein the notifying unit is a second loudspeaker.

12. The proximity alarm system of claim 10, wherein the notifying unit is an indicator.

13. A mobile device comprising:
a main body part;
a drive unit mounted on the main body part;
the proximity alarm device as defined in claim 1; and
a first loudspeaker, as the external loudspeaker, connected between the output terminal of the proximity alarm device and the ground terminal of the proximity alarm device, and disposed such that a sound can be released to an outside of the main body part.

14. A method for diagnosing a failure of the proximity alarm system of claim 9 by using the proximity alarm system, the method comprising:
outputting the audio signal in response to the input of the referencing signal;
amplifying the audio signal;
outputting the first detection signal based on the output signal of the capacitor;
outputting the second detection signal based on the output signal of the amplifying unit;
comparing the voltage amplitude of the detection signal and the voltage amplitude of the determination reference signal with each other; and
comparing the voltage amplitude of the first detection signal and the voltage amplitude of the second detection signal with each other.

15. The method of claim 14, wherein when the first detection signal is output, the audio signal is wave-detected, and a direct current signal based on the audio signal is output as the first detection signal.

16. The method of claim 14, further comprising setting an amplification degree of the amplifying unit, and changing a value of the first determination reference signal into a value corresponding to the amplification degree of the amplifying unit.

17. The method of claim 14, further comprising:
converting the first detection signal into a first digital signal; and
converting the second detection signal into a second digital signal.

18. The method of claim 17, wherein:
when the first detection signal is converted into the digital signal, 100 first data are sampled from the first detection signal for 10 msec, and an average value of the sampled first data is calculated, and
when the second detection signal is converted into the second digital signal, 100 second data are sampled from the second detection signal for 10 msec, and an average value of the sampled second data is calculated.

19. The method of claim 14, wherein when the audio signal is amplified, a voltage value at the time when the audio signal is amplified is sensed, and the voltage value and a predetermined threshold value are compared with each other.

20. The method of claim 19, wherein when the voltage value is larger than the threshold value, it is determined that an overcurrent flows in the amplifying of the audio signal.

21. The method of claim 14, further comprising converting the amplified audio signal into an alarming sound, and outputting the alarming sound.

22. The method of claim 14, further comprising notifying a comparison result between the first detection signal and the first determination reference signal.

23. The method of claim 22, wherein the comparison result is notified by a sound.

24. The method of claim 22, wherein the comparison result is notified by a display.

25. The method of claim 14, the method further comprising:
sensing the referencing signal; and
operating the amplifying unit based on the sensed result of the referencing signal.

26. The method of claim 14, wherein the audio signal is output with a delay from an input of the referencing signal.

27. The proximity alarm device of claim 1, wherein the control unit outputs the audio signal after a predetermined time from reception of the referencing signal.

28. The proximity alarm device of claim 1, wherein:
the control unit outputs a signal indicating presence or absence of an output of the audio signal, and
the determining unit receives the signal indicating the presence or the absence of the output of the audio signal.

29. The proximity alarm device of claim 1, wherein the determining unit diagnoses that:
the output side of the amplifying unit is short-circuited to the ground terminal when the voltage amplitude of the first detection signal is smaller than the voltage amplitude of the first determination reference signal; and
the capacitor is short-circuited when the voltage amplitude of the first detection signal is equal to the voltage amplitude of the second detection signal.

30. The proximity alarm device of claim 29, wherein the determining unit further compares the voltage amplitude of the first detection signal output from the first detection unit and a voltage amplitude of a second determination reference signal different from the first determination reference signal, with each other.

31. The proximity alarm device of claim 30, wherein the determining unit diagnoses that the output terminal is open when a maximum voltage amplitude of the first detection signal is larger than the voltage amplitude of the second determination reference signal.

* * * * *